Oct. 31, 1967  G. M. STANDAL  3,349,818
LOG CARRIAGE APPARATUS
Filed Aug. 27, 1965  6 Sheets-Sheet 4

INVENTOR.
GEORGE M. STANDAL
BY
*Wells & St. John*
ATTYS.

Oct. 31, 1967  G. M. STANDAL  3,349,818
LOG CARRIAGE APPARATUS
Filed Aug. 27, 1965  6 Sheets-Sheet 5

INVENTOR.
GEORGE M. STANDAL
BY
ATTYS.

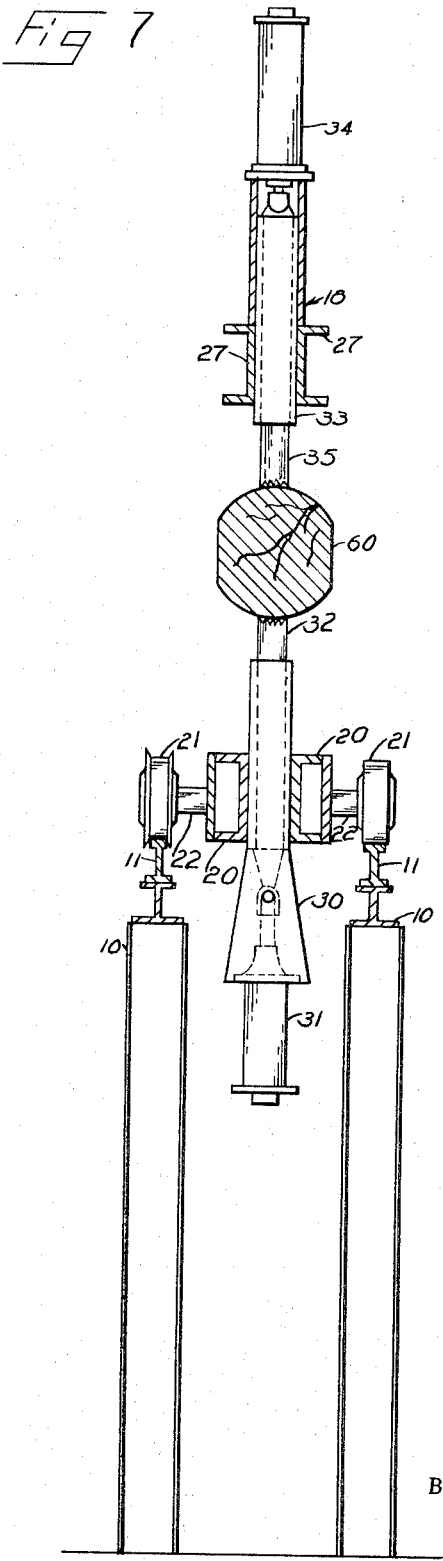

United States Patent Office 3,349,818
Patented Oct. 31, 1967

3,349,818
LOG CARRIAGE APPARATUS
George Martin Standal, Chemainus, British Columbia, Canada
Filed Aug. 27, 1965, Ser. No. 483,174
5 Claims. (Cl. 143—105)

ABSTRACT OF THE DISCLOSURE

A vertical carriage for holding wooden cants or logs during chipping or sawing operations. The carriage includes a movable longitudinal frame having independent upper and lower dogs to grip the workpiece in opposition to one another. The dogs are independently movable to accommodate contour variations in the workpiece.

---

This invention relates to a novel log carriage apparatus including unique means for handling and longitudinally moving logs of various shapes and sizes.

The device illustrated in the accompanying drawings is designed to hold logs during passage of the logs between opposite knives for chipping and squaring purposes. Conventional log carriages are designed to longitudinally propel logs past a stationary saw, and do not require clearance of the log at each side of the carriage. For high speed chipping and log squaring operations, it is essential that two sides of the log be exposed for chipping purposes. It is also essential that the carriage be equipped to accommodate tapered logs of varying cross sectional dimensions and logs that are not perfectly straight or uniform along their length.

It is a first object of this invention to provide such a carriage that can accommodate logs of differing dimensions, logs of differing lengths, and logs of non-uniform configuration.

Another object of this invention is to provide such a device that is self centering and which can permit ready adjustment of the height of the log as required by its particular size.

Another object of this invention is to provide such a carriage in combination with log handling devices capable of turning the log about its center so as to properly align it for squaring purposes.

These and further objects will be evident from the following disclosure, taken together with the accompanying drawings which illustrate a preferred form of the invention. It is to be understood that this form of the invention is not to limit the scope of the invention except as it is defined in the annexed claims.

In the drawings:

FIGURE 7 is an enlarged cross sectional view taken along line 7—7 in FIGURE 1.

Figure 1:
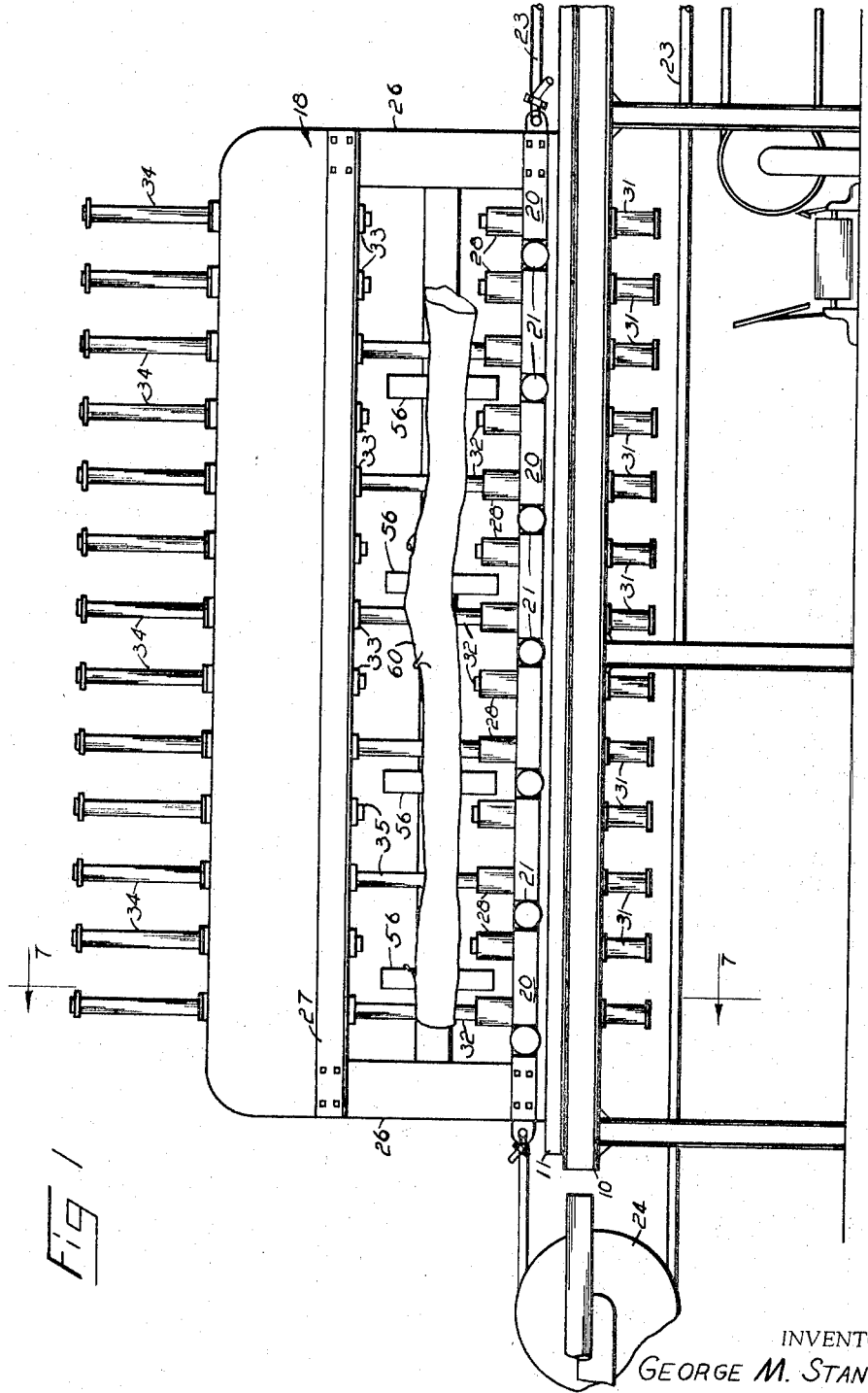
FIGURE 1 is a side elevation of an apparatus including the instant log carriage.

In U.S. Patent No. 3,190,326, granted June 22, 1965, I have disclosed a chipper apparatus for squaring logs by use of opposed cutting heads having bent peripheral knives that plane opposite sides of a log and produce usable wood chips rather than sawdust. To adapt this type of apparatus to typical logs of varying sizes, shapes and dimensions, I have found it necessary to design a unique carriage in which the log is freely exposed at each side for passage between the cutting heads. The carriage illustrated in the accompanying drawings provides the required flexibility and adaptability to allow my chipper apparatus to be utilized in the squaring of irregular logs of differing diameters.

As shown in the drawings, particularly FIGURES 1, 3, 5 and 7, the carriage is mounted on a fixed supporting framework 10 including transversely spaced longitudinal rails 11 that extend along the full length of framework 10. The rails 11 are the supporting members for the longitudinally movable carriage described below. Intermediate the ends of framework 10 are two raised pedestals 12 at each side thereof, the pedestals 12 being used to mount the chipper apparatus described in my above mentioned patent. Generally, this chipper apparatus comprises transverse rods 13 that adjustably carry motor supports 14 for individual motors 15 that drive the cutting heads 16. Each of the cutting heads 16 mounts a member of peripheral bent knives 17, the details of which are described in my above mentioned patent and which need not be elaborated further in the present discussion.

The carriage comprises a movable frame, generally designated by the numeral 18, including spaced lower longitudinal members 20. Carried by the members 20 are transverse axles 22 on which are mounted flanged wheels 21 that ride along the upper surfacs of the respective rails 11 (FIGURE 7).

At the ends of the carriage frame 18 are uprights 26 that support upper longitudinal members 27 mounted parallel to the members 20. Members 27 are spaced vertically above members 20 and define an open area mounted by the respective members 20, 26 and 27. Mounted within this area are a series of upper and lower dogs, respectively designated by the numerals 35 and 32.

The lower dogs 32 are slidably supported for vertical movement within lower guides 28 having flanged bottom sections 30 and carrying vertical cylinders 31, the piston rods of cylinders 31 being connected to the respective dogs 32. The flanged sections 30 protect cylinders 31 from damage due to chips and debris that fall downwardly during the chipping process.

The upper dogs 35, mounted in direct opposition to the dogs 32, are slidably carried within fixed guides 33 mounted between the upper longitudinal members 27. The guides 33 carry cylinders 34, the piston rods of which are connected to the dogs 35.

The control of cylinders 31 and 34 is readily accomplished, using conventional control devices. Each cylinder is individually controlled, although various combinations of cylinders could be controlled in unison if desired. Control of the individual cylinders is preferably accomplished by power-centered neutral solenoid valves that permit the stroke of the respective pistons to be limited at any desired position. Use of a flow control valve in the pressure inlets and outlets permits the speed of operation of the respective cylinders to be set at any desired rate.

Cylinders 31, 34 are preferably pneumatically operated, but can also be operated by a hydraulic system if desired. The air or hydraulic lines, as well as the required electrical connections, can be supplied by means of a pantograph (not shown) used to supply power to conventional log carriages.

The carriage frame 18 can be reciprocated relative to framework 10 by any desired type of mechanism. Illustrated is a cable 23 whose respective ends are fixed to the ends of the frame 18. Cable 23 is wound over sheaves 24 rotatably journalled at the ends of framework 10.

Figure 2:
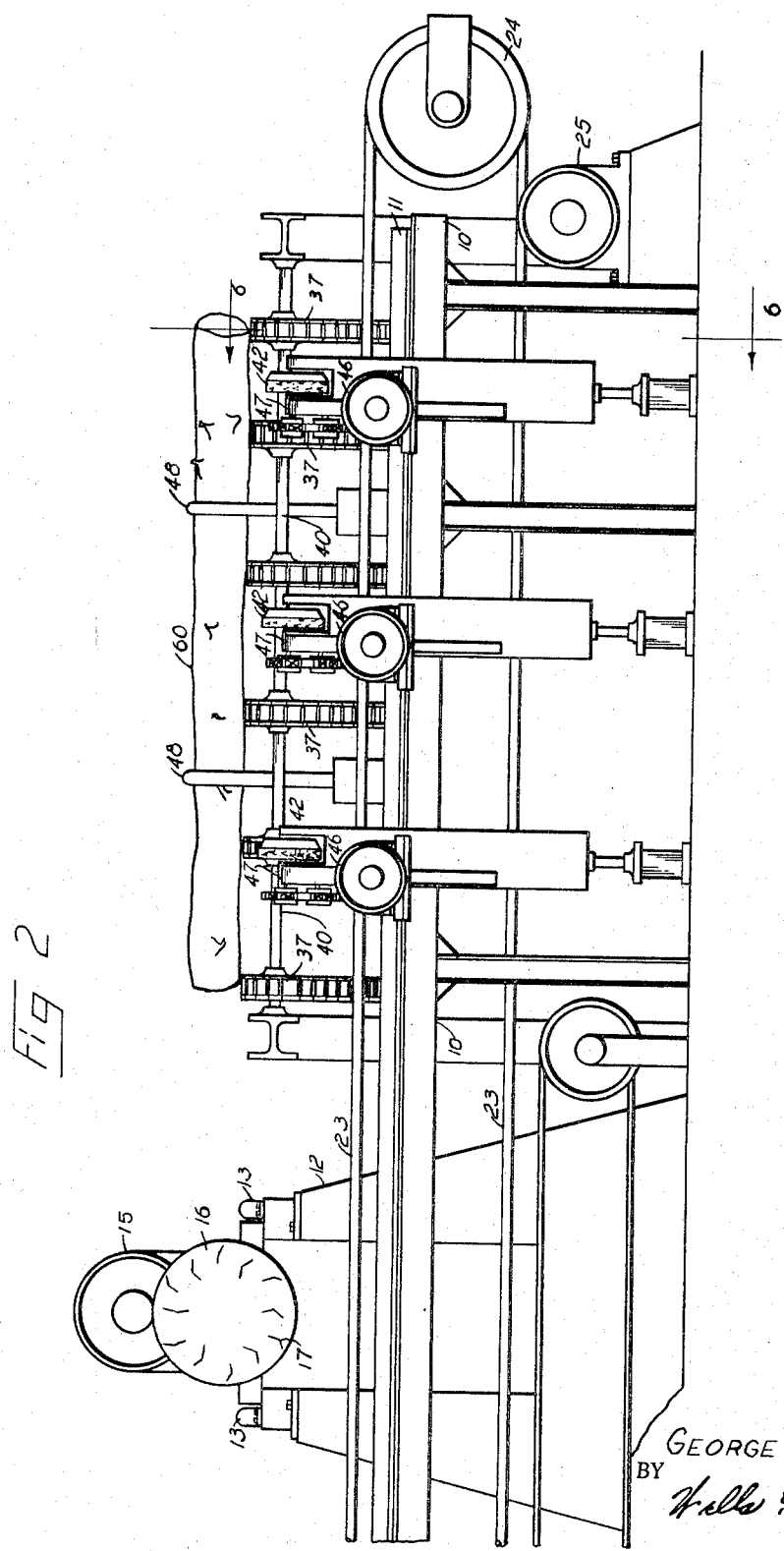
FIGURE 2 is a continuation of the apparatus as seen to the right of FIGURE 1.
Figure 4:
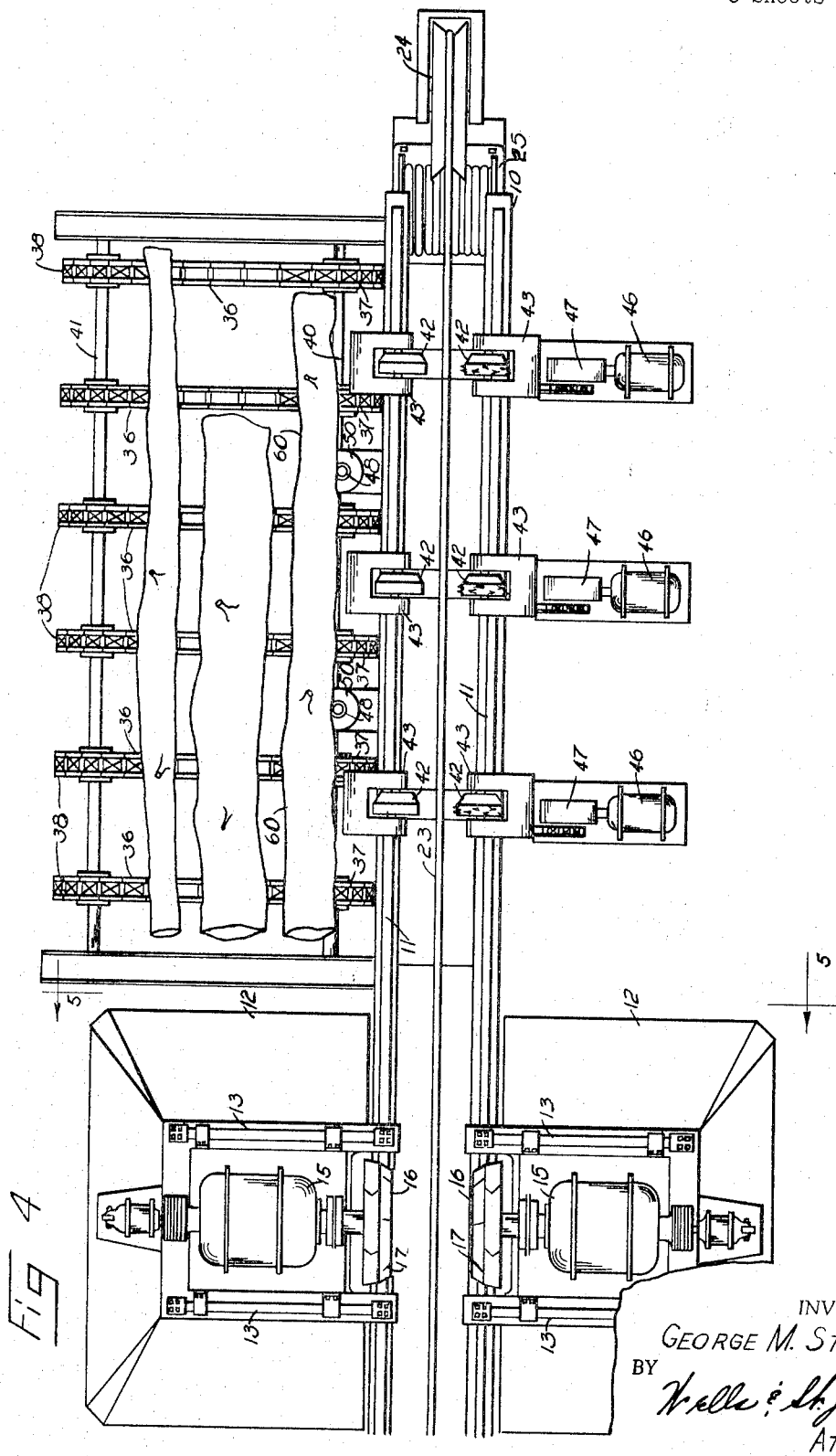
FIGURE 4 is a top view of the apparatus shown in FIGURE 2.
Figure 5:
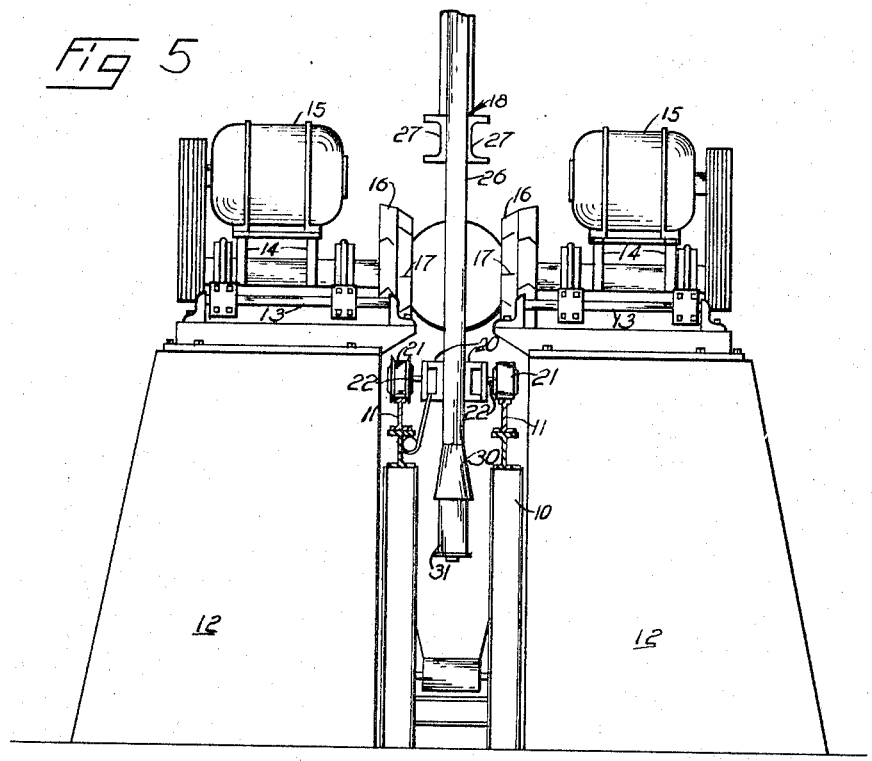
FIGURE 5 is a sectional view taken along line 5—5 in FIGURE 4.

The sheave 24 shown in the right in FIGURES 2 and 4 is powered by a motor and transmission unit 25 that is capable of moving the frame 18 and positioning it where desired.

Figure 6:
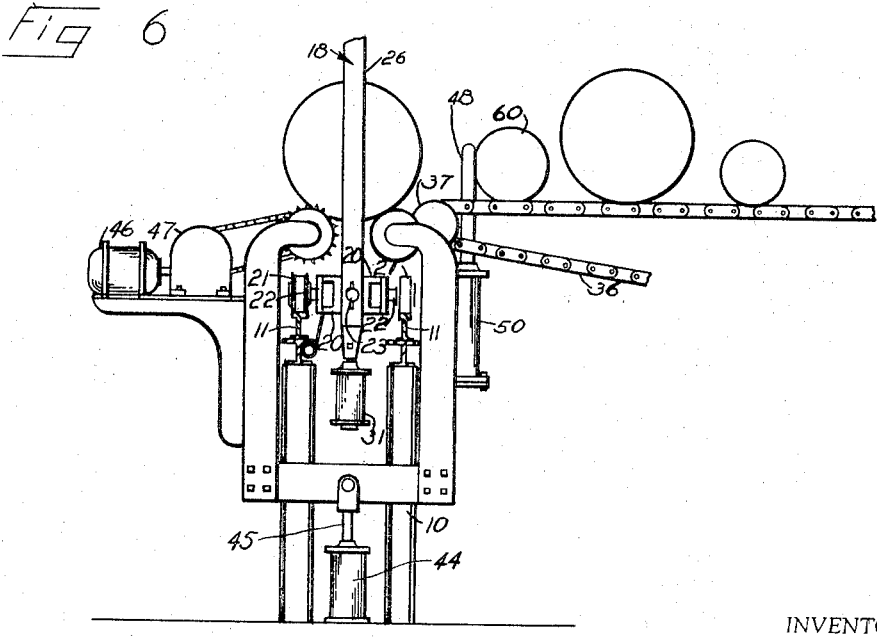
FIGURE 6 is a sectional view taken along line 6—6 in FIGURE 2.

To assist in the handling of logs, a transverse input conveyor is shown in FIGURES 2, 4, and 6. This comprises a series of longitudinally spaced conveyor chains 36 wound over sprockets 37 and 38 on axles 40 and 41 respectively. The top surfaces of chains 36 lead to vertically adjustable support rolls 42 mounted on supporting frame 43 suitably guided by the stationary framework 10. Each frame 43 is vertically adjustable by operation of an individual cylinder 44 having a piston rod 45 connected to its lower section.

Each transversely spaced pair of rolls 42 has one or more rolls with faces capable of frictionally engaging the surface of a log. Such a surface might be serrated or provided with protruding spikes. These rolls are mounted on the frame 43 and rotatably powered by means of individual motors 46 and transmission units 47.

Also mounted on the framework 10 are a number of stop pins 48 (FIGURE 6) which are vertically movable by means of cylinders 50 to prevent further passage of logs beyond the pins 48 when in their raised positions. Pins 48 are utilized to prevent passage of more than one log to the rolls 42 at any given time.

Figure 3:
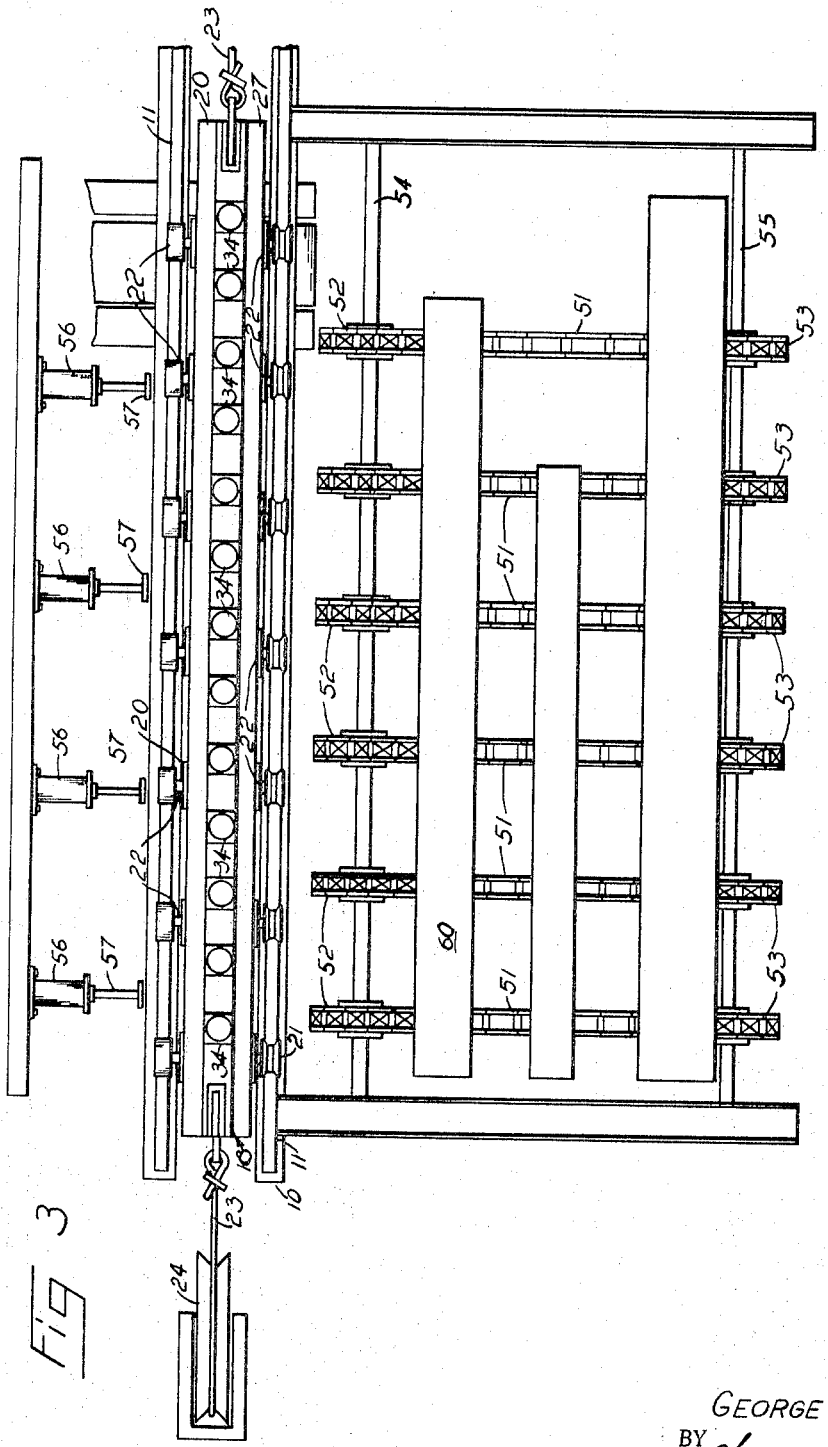
FIGURE 3 is a top view of the apparatus shown in FIGURE 1.

At the output end of the apparatus, when in FIGURES 1 and 3, there is provided an output conveyor comprised of transverse chains 51 mounted on sprockets 52 and 53 carried by shafts 54 and 55 respectively. Any suitable mechanical device can be utilized to assist in moving logs from the carriage frame 18 to the chains 51, such as the cylinders 56 with pusher plates 57.

The operation of this carriage apparatus is basically obvious from the description given. An incoming log 60 is first stopped by the raised pins 48 on fromework 10 after being moved against the pins 48 by powered operation of chains 36. When the carriage frame 18 has been positioned at the right hand end of the machine as shown in FIGURES 1 through 4, the log 60 is permitted to move onto the raised rolls 42 by dropping pins 48 and operating chains 36. Log 60 can then be vertically adjusted and rotated to orient the log relative to framework 10 so as to produce the most efficient use of the lumber to be obtained therefrom. Rotation of rolls 42 is accomplished by operation of motors 46.

When log 60 has been properly oriented by operation of rolls 42, the required upper dogs 35 are individually brought downwardly into position against the top surface of log 60. The necessary number of dogs 35 required to contact the length of the individual log being processed can be activated individually. In some instances, small diameter logs will not require contact by all of the dogs, and alternate dogs can be utilized as illustrated in FIGURE 1. The use of power centered valves to control the operation of the cylinders 34 permits the individual dogs 35 to be positioned as necessary to accommodate crooked log sections and the taper and diameter variations that occur in typical logs.

As rolls 42 are lowered by operation of cylinders 44, the lower dogs 32 opposed to the activated dogs 35 are raised. Then the dogs 32 are actuated to firmly support the log regardless of its shape.

The log is then run through the area between the chipper heads 16 by operation of the motor and transmission unit 25, which operates the cable 23. If chipping of the log on four sides is desired, the frame 18 is returned to its right hand position, and rolls 42 are again raised, after release of upper dogs 35. The motors 46 can then be operated to turn the log 90 degrees and the previously planed surfaces can then be contacted by the respective dogs 35 and 32. Frame 18 is then reciprocated once more past the chipper heads 16 so that the log 60 will emerge with all four sides squared. At the left hand end of the machine, after the chipping operation has been completed, the upper dogs 35 are raised and the log is pushed onto the receiving chains 51 by operation of cylinders 56.

This apparatus has the advantage of providing positive gripping of a log at longitudinally spaced positions along the entire length thereof so that crooked logs are not unnecessarily distorted by pressure of the cutting knives. The logs can be chipped to any desired thickness since the frame 18 can be utilized to make any number of passes across the transversely adjustable chipper heads 16. The free clearance provided at both sides of the log by means of the gripping dogs 32, 35 permits two slabs to be removed from the log in a single pass between the opposed heads 16. The cutting action of the knives 17 cuts to the center line of the machine making both slabs identical and provides automatic parallel cutting action at each side of a log. The taper of a small log is removed at both sides thereof rather than on only one side, thereby improving the quality of the lumber obtained after squaring. The vertical centering of the log center line is obtainable by adjustment of the individual cylinders 44 while the log is held by the rolls 42, providing increased flexibility in positioning the log on the carrier frame 18.

Various modifications could be made in the structural details of the apparatus illustrated without deviating from the scope of this invention. For this reason, only the following claims are intended to define the invention as disclosed herein.

Having thus described my invention, I claim:

1. In a carriage for holding logs for longitudinal motion;
    a supporting framework;
    a movable frame carried by said framework for longitudinal motion relative thereto;
    a plurality of independent lower dogs movably mounted on said frame adapted to engage the lower surface of a log supported longitudinally thereon;
    and a plurality of independent upper dogs movably mounted on said frame, the upper dogs being mounted in opposition to the lower dogs and being adapted to engage the upper surface of a log engaged on said lower dogs.

2. An apparatus as defined in claim 1, further comprising:
    log engaging rolls mounted on said framework at each side of said frame about axes parallel to the intended longitudinal motion of said frame;
    log delivery means on said framework to selectively deliver logs to said rolls;
    and power means on said framework operatively connected to said rolls to rotate said rolls and a log supported thereon.

3. An apparatus as defined in claim 1, further comprising:
    hydraulic cylinders on said frame individually connected to each of said upper and lower dogs;
    and equalized hydraulic pressure controls connected to said cylinders.

4. An apparatus as defined in claim 1, wherein each of said upper and lower dogs, comprises:
    a rod having a serrated outer end;
    a fixed guide on said framework slidably guiding said rod for motion in a plane perpendicular to the intended direction of motion of said frame;
    and a hydraulic cylinder having its base anchored to said frame and its piston rod operatively connected to said rod.

5. In a carriage for logs:
    a rigid fixed supporting framework;
    a track on said framework;
    a movable frame carried on said track, said frame including spaced upper and lower members in vertical alignment extending parallel to said track;
    a plurality of lower dogs slidably mounted on said frame lower member projecting upwardly therefrom toward said frame upper member;

a plurality of upper dogs slidably mounted on said frame upper member projecting downwardly therefrom toward said frame lower member;

powered means on said frame individually coupled to each of said upper and lower dogs adapted to move each dog independently relative to said frame;

and means on said framework operatively connected to said frame to selectively move said frame parallel to said track.

References Cited

UNITED STATES PATENTS

| 2,230,803 | 2/1941 | Klein | 83—458 |
| 2,964,074 | 12/1960 | Brown | 143—52 XR |
| 3,082,801 | 3/1963 | Dillingham | 144—242 XR |
| 3,190,326 | 6/1965 | Standal | 144—162 |
| 3,242,954 | 3/1966 | Schikorsky | 143—10 XR |

WILLIAM W. DYER, JR., *Primary Examiner.*

W. D. BRAY, *Assistant Examiner.*